Figure 1:
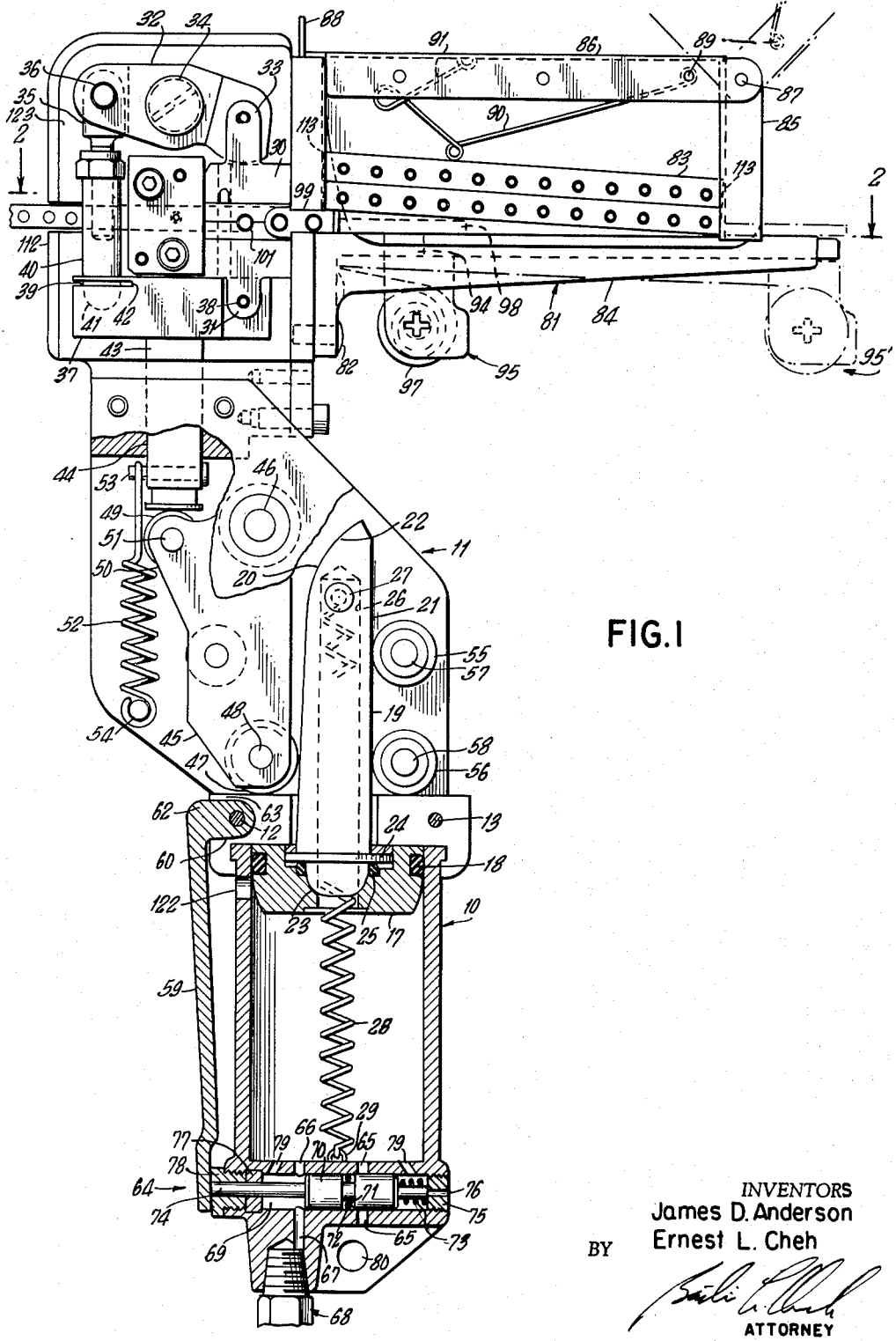

Nov. 16, 1965  J. D. ANDERSON ETAL  3,217,872
CONNECTOR CARRY BLOCK AND CONNECTORS
Original Filed Nov. 24, 1958  2 Sheets-Sheet 1

INVENTORS
James D. Anderson
Ernest L. Cheh
BY
ATTORNEY

Nov. 16, 1965   J. D. ANDERSON ETAL   3,217,872
CONNECTOR CARRY BLOCK AND CONNECTORS
Original Filed Nov. 24, 1958   2 Sheets-Sheet 2

INVENTORS
James D. Anderson
Ernest L. Cheh
BY
ATTORNEY

United States Patent Office 3,217,872
Patented Nov. 16, 1965

3,217,872
CONNECTOR CARRY BLOCK AND
CONNECTORS
James D. Anderson and Ernest L. Cheh, Norwalk, Conn., assignors to Burndy Corporation, a corporation of New York
Original application Nov. 24, 1958, Ser. No. 775,815, now Patent No. 3,021,738, dated Feb. 20, 1962. Divided and this application Aug. 23, 1961, Ser. No. 133,450
2 Claims. (Cl. 206—65)

This application is a division of S.N. 775,815 filed Nov. 24, 1958, now U.S. Patent 3,021,738, issued February 20, 1962.

Our invention relates to a power operated compressing tool, and more particular, to a fluid powered tool useful for compressing articles fed to the tool from a magazine.

Previously, tools for crimping small size electrical connectors consisted mainly of hand operated mechanical tools requiring the operator to exert sufficient manual force to produce the indentation. This operation becomes strenuous and tiresome after a number of indentations have been made. For large size indentations, hydraulic tools have been devised to provide the necessary pressure to make the indentation, but these tools have great bulk and, therefore, are not suitable for use in tight quarters. Pneumatic tools have also been devised; however, these consisted of a stationary jaw and a movable rocker type jaw which moved about a fulcrum pin. This type of tool requires great bulk on the jaws to prevent the tool jaws from springing excessively and breaking off.

Moreover, while it is known to have a compressing tool capable of feeding a plurality of connectors to the jaws in sequence, it has always been considered necessary to couple these connectors together or to feed them to the jaws through a hopper mechanism.

It is, therefore, an object of our invention to provide a small power compressing tool which is compact and which can easily be operated without fatigue and which also will produce automatically a full depth of crimp or indent.

Other objects are: to provide such a tool which will lend itself to magazine feeding; and to provide a magazine feed which is especially useful for positioning electrical connectors in a tool.

Further objects of our invention consist in providing an adjustment to take up for the allowable tolerances in manufacture of the dies used to make the indentations and other parts of the tools, and a locking mechanism for this adjustment; to provide an adjustment for the full cycling control system for the various air pressures at which the tool may be operated; and to provide a means to enable the force inducing the cam and piston to travel upwards, without jamming the piston, when manufacturing tolerances allow the cam to tilt.

Still further objects of our invention consist in providing a magazine feed which utilizes the connectors positioned in a carry block; a tool which utilizes the connectors themselves as a guide for locating and uses spring loaded indenter dies to enclose the circumference of the connector before indenting.

One of the features of our invention is the provision of a fluid operated tool for compressing articles in which a pair of dies are mounted on a frame and a piston causes the dies to move in a linear path towards each other.

Another feature of our invention is the provision of a tool for compressing an article between a pair of jaws, in which a carry block is utilized to support a plurality of articles and the block is advanced toward the jaws until one of said articles contacts a stop, conducive of the proper locating of that article for compressing.

Figure 3:
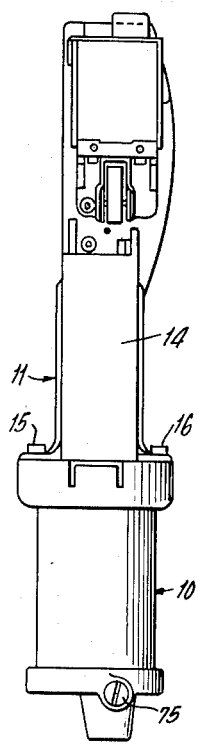
Figure 2:
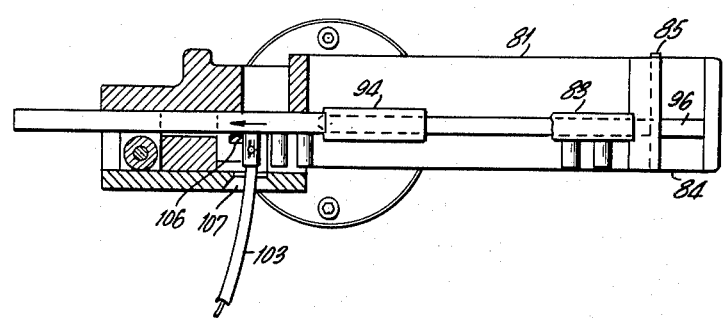
Figure 4:
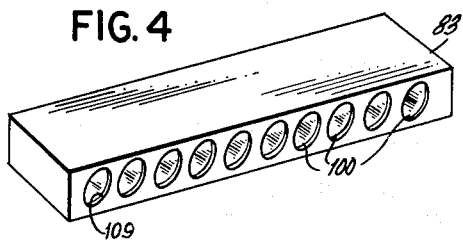
Figure 6:
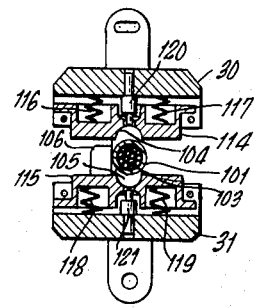
Figure 7:
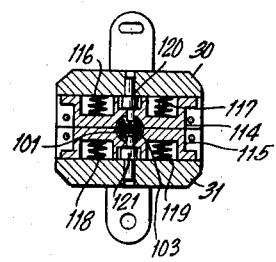
Figure 5:
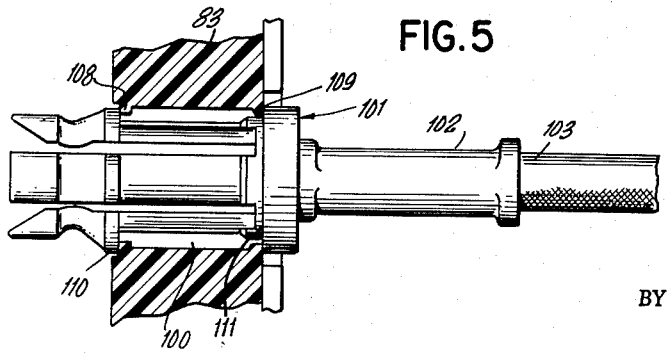

We accomplish these and other objects and obtain our new results as will be apparent from the device described in the following specification, particularly pointed out in the claims, and illustrated in the accompanying drawing, in which:

FIG. 1 is a side elevation partly in section of the tool;
FIG. 2 is a view, partly in section, taken along the lines 2—2 of FIG. 1;
FIG. 3 is a front elevation;
FIG. 4 is a perspective view of a carry block used in the magazine feed for supporting the articles to be compressed;
FIG. 5 is a sectional view taken through the carry block and a supported electrical connector to be crimped in the tool;
FIG. 6 is a cross-sectional view of the die set used in the tool; and
FIG. 7 is a view of the die set of FIG. 6 compressing an article located therein.

Referring to FIGS. 1–3 of the drawing, a compressing tool in accordance with the principles of our invention is therein illustrated in the actuated position and is shown to comprise a cylinder body 10 and a frame 11 which is clamped to the cylinder and locked in position by cap screws 12 and 13. Cover 14 encloses the frame 11 and is clamped thereto by screws 15 and 16. Within the cylinder is reciprocally mounted a fluid operated piston 17 provided with a circular groove to house a conventional packing ring 18, and an integrally formed extension 19 substantially square in cross section, having a lateral cam surface 20, a bearing surface 21 and a clearance surface 22 at the end thereof for a purpose to be described later. The other end of the formed extension 20 has a convex semi-spherical shape, which mates into a concave semi-spherical seat or groove 23 on the piston 17. Special washer 24 and conventional packing ring 25 form a seal for the seated semi-spherical parts. A longitudinal drilled bore 26 is provided in the extension 19 in which is secured by pin 27 one end of a return tension spring 28, the other end of the spring being anchored to retaining bolt 29 threaded into the bottom of the cylinder.

Crimping head

At the other end of the frame 11 there is provided a crimping head comprising complementary upper and lower crimping die parts 30 and 31. Upper die part 30 is rotatably mounted to link lever 32 at pin 33. The link lever 32 is pivoted to the frame 11 at pin 34 and rotatably secured to adjustable link 35 at 36. Lower die part 31 is pinned to a plunger or driven member 37 and 38. The driven member 37 is also connected by a slotted washer 39 to adjusting link socket 40 within which adjustable link 35 is threadably mounted. The driven member 37 is recessed to receive the link socket 40 and slotted at 42 to receive the slotted washer 39. The end of the driven member 37 terminates in a portion 43 which is driven by a socket mechanism as will be hereinafter described.

When the plunger is upwardly driven the lower die part 31 and link parts 35 and 40 are simultaneously moved. The link lever 32, by reversing the link movement, drives the upper die part 30 towards lower die part 31 in a linear movement. Thus the die parts are compressed towards each other about an inserted article. To maintain the various moving parts in position, the frame 11 is provided with a bore 44 into which the driven plunger 43 slides. The die parts are confined in the frame, forcing the die parts to move only in a linear direction towards and away from each other about the article which is held in a stationary position during the crimping operation.

Between the fluid driven piston 17 and the crimping head is the driving rocker mechanism which comprises the rocker 45 pivotally mounted to the frame 11 at fulcrum pin 46. Provided at one leg of the rocker 45 is roller bearing 47 supported thereto by pin 48, and on the other leg for driving plunger portion 43 is mounted roller bearing 49 supported on the leg 50 of the rocker by pin 51. Return spring 52 is mounted to the end of the plunger portion 43 by pin 53 and to the frame 11 by pin 54. The return spring 52 thus forces the plunger portion 43 to the retracted position, opening die parts 30 and 31 which are always ready to receive a connector in position for crimping. The return spring 52 also causes the rocker 45 to ride the cam surface 20 on roller 47.

Roller bearings 55 and 56 are mounted within the head of the tool by cross pins 57 and 58, respectively, and ride on bearing surface 21 of the piston extension 19 to maintain the piston extension 19 in a proper alignment when fully extended for the crimping operation. The cam surface 20 is designed to give the rocker 45 its greatest movement at the start of the crimping operation and to transmit the greatest force toward the end thereof.

The lever handle 59, controlling the power operation of the tool, is pivotally mounted through an ear 60 at one end, to the circular base portion of the head of the tool by screw 12. The lever handle extends substantially the length of the body 10 to the end thereof and is provided with offset portion 61 at the free end. A small projection 62 on the lever handle 59 near the extending ear 60, abuts the circular base portion 63 of the frame 11 to limit the outward movement of the lever handle 59.

Valve unit

The valve unit 64 is located at the lower end of the body 10. Two longitudinally drilled fluid passages 65 and 66 lead to the inside of the body and offset from the center thereof to avoid interference by the anchoring bolt 29 connected to the return spring 28; exhaust passage 65 extends to the atmosphere, while inlet passage 66 extends to the inlet port 67, to which is threadedly attached the flexible air inlet hose 68. The valve cylinder 69 is transversely positioned in the valve unit to intercept the passages 65 and 66 and receive the valve piston 70 having an annular undercut groove 71 which contains conventional packing ring 72 to prevent leakage from passages 66 to 65. The valve piston 70 is spring loaded by return spring 73 to an extended position to block the inlet passage 66, at which time the exhaust port 65 is open to vent the cylinder around the spring end of the piston. The piston is moved inwardly by the offset portion 61 of the lever handle 59, compressing the return spring 73 and aligning the stem 74 of the valve piston with the passage 66 to permit charging the cylinder, and simultaneously blocking the exhaust passage 65. At the back end of the valve unit located near the return spring, is an adjusting screw 75 which contains a longitudinally drilled hole 76 for release to the atmosphere of any leaking fluid. At the front end of the valve unit is a valve adaptor 77 which is counter-bored to receive a conventional packing ring to prevent leakage around the stem of the valve piston and is held in place by valve adaptor cap 78, which is threaded into the front end of the valve unit. Angularly drilled hole 79 allows fluid leakage to escape to the cylinder, allowing the valve piston to operate to its full stroke.

Supporting aperture 80, located at the end of the valve unit, permits the tool to be conveniently suspended when not in use.

Magazine

The feeding mechanism comprises an auxiliary carry block compartment 81 secured to the frame portion 11 by screws 82. The compartment stores a plurality of stacked carry blocks 83 and includes a slotted bottom frame 84, end portion 85 suitably secured thereto, cover 86 hinged at pin 87 and snap-locked at latch 88. Hinged on the inside of the cover at 89 is a skid 90 which is acted upon by spring 91, hinged at 92 and 93. Skid 90 urges the carry blocks 83 towards the bottom frame 84. A feed trigger 94 is mounted to a bracket 95 and slides in slot 96 of the bottom frame 84. A coiled spring 97 is contained in the feed trigger with one end of the spring secured to the frame. The spring 97 is tightened by sliding the feed trigger to the end of the slot 96 in the bottom frame 84 in the position indicated by the dot-dash lines in FIG. 1.

The upper portion of the feed trigger may be employed as a carry block driver 98. The driver in the retracted position shown in dot-dash lines falls behind the lowest positioned carry block which is thus urged by the coiled spring 97 to enter feed slot 99 into the compressing device.

The carry block 83 is shown in FIGS. 4 and 5 comprising a rectangular block of suitably shape-returning material such as polyethylene or nylon plastic and is provided with a series of spaced bores 100, each bore containing an article to be compressed, such as the connector 101.

The connector barrel 102 which is to be crimped to the bared end of the wire 103 extends beyond the end of the carry block 83. As the cartridge passes into slot 99, the sides of the connector barrel 102 are accommodated within upper and lower grooves 104 and 105 formed in the sides of the upper and lower die parts 30 and 31, respectively.

When the die parts are opened, the cartridge-block 83 holding connector barrel 102 in position is advanced by spring 97 into the compressing device until the barrel 102 is directly in position for crimping. At this point the connector barrel engages a stop 106. This positions the connector 101 for crimping. Upon insertion of the conductor 103 through frame opening 107 into the barrel 102, the tool is operated and the connector is crimped or indented. The crimped connector is pulled out of the bore of the carry block and away from stop 106; releasing the carry block 83 which advances until another protruding connector engages the stop 106 permitting a new connection to be made.

As is shown in FIG. 5, the bore 100 of the carry block 83 may be provided with peripherally extending shoulders 108 and 109, one at each end of the bore 100 which are formed to cooperate with corresponding shoulders 110 and 111 of the connector as shown. Since the block is made of a shape-returning or resilient material, shoulders 108 and 109 are resilient and although deformed on the insertion of the connector 101 into the bore 100, will snap back to secure the connector against accidental release from the bore.

Other methods may be employed to secure the connectors inside the carry blocks.

It will be readily seen that if a connector is missing from one of the bores, the carry block 83 will advance until next available connector reaches the stop 106 which automatically positions its connector for proper crimping.

As the completed connections are finally pulled from the carry block, the used carry block is expelled through opening 112 in the frame 11 and a new block 83 falls upon driver 98 urged by spring 91. The new carry block is then inserted into the crimping device by cocking the feed trigger 94 as previously explained.

Loading operation

In order to load the compressing tool of our invention and feed a connector into the crimping position, it is first necessary to release the cover latch 88 and open the cover 86 about pin 87, as shown by the dotted lines in FIG. 1. A plurality of carry blocks 83 are aligned and fed into the magazine slots 113. The slots 113 guide the carry blocks into proper alignment. The cover 86 is then closed and locked in place by cover latch 88. When the cover 86 is closed, the skid 90, which is spring loaded due to spring 91, will be deflected and apply a slight pressure on the carry strips 83. The feed trigger 95 is then retracted to the dotted position 95 shown. This causes the spring loaded skid 90 to force the lowest carry block 83 down into the feed position. Releasing the feed trigger 95 from its retracted position causes the driver 98 to push the lowermost carry block 83 into the slot 99 until the first connector in the carry block abuts against the connector stop 106 connected to the lower die half 31. The compressing tool is now in position to make a connection between a conductor and connector. A conductor (from which the insulation, if any, is stripped from the end) is inserted in the connector barrel 102, and the actuating lever 59 is pressed and released.

*Compressing operation*

The external air line 68 is coupled to a source of air supply not shown. With the conductor 103 positioned in the connector barrel 102, the lever 59 is actuated. This actuation depresses the valve piston 70, closes the air exhaust port 65 and opens the air inlet port 67, allowing air to flow into the cylinder 10. The extension 10, which is coupled to the piston 17, is caused to move upward due to the pressure building up in the cylinder 10. The upward movement of the extension 19 causes the cam rocker 45 to rotate about pin 46, producing an upward movement of the driver member or plunger 37.

This upward movement of the plunger 37 is transmitted in two directions. At the right side of the plunger 37 the movement is transmitted out into an upward movement of the lower die set 31. At the left side of the plunger 37, the movement is transmitted by adjustable link 35 to pivot the link lever 32 about pivot pin 34, causing the upper die half 30 to move downward. As the upper and lower die portions 30 and 31 move toward each other under the action of the mechanism described above, grooved confining blocks 114 and 115 close about the connector barrel 102.

As the compression cycle progresses, the confining blocks 114 and 115 are further compressed against their springs 116, 117, 118 and 119, causing the indenter pins 120 and 121 to move inward, contacting and deforming the connector barrel 102 into a uniform controlled compression grip about the conductor 103. Releasing the actuating lever 59 allows the spring loaded valve piston 70 to close off air inlet port 67 and open air exhaust port 65. This allows the mechanism to retract to its open position. The retraction of piston 17 due to return spring 28 permits the movable die parts 30 and 31 to be open and the rocker depressed by spring 52. This permits the compressed wire and connector 103 and 101 to be removed by a pull on the wire. Due to the plastic characteristics of carry block 83, the connector is released. Under the action of the drive 98, the carry block is advanced until the next connector in the carry block abuts the stop 106 and enables the cycle to be repeated.

*Full cycling features*

The full cycle control feature which prevents incomplete compression from occurring if the actuating lever 59 is not depressed long enough operates as follows:

When the actuating lever 59 is depressed, it opens air passages 66 and 67 and blocks the exhaust passage 65. This allows fluid pressure to flow into the cylinder 10. This fluid pressure produces a force on the surface of the valve piston 70 which is greater than the returning force of spring 73. A sealed pressure chamber is thereby produced and the actuating lever 59 can be released without the valve piston 70 returning to its outer or extended position. Therefore, this compels the piston 17 and extension 19 to travel to its fully extended position, producing a complete and full crimp. Upon reaching its fully extended position, conventional packing ring 18 on piston 17 passes the cycling release hole 122 in the cylinder 10 and relieves the pressure in the sealed chamber which removes the force on the valve piston 70. The valve piston return spring 73 can now push the valve piston back to its original position. Through this method, it is impossible to obtain anything less than a full and complete crimp. The full cycling control can be adjusted for various fluid pressures by adjusting screw 75 which in turn adjusts the tension on spring 73.

*Adjustments*

Adjustment for manufacturing tolerances is obtained as follows: With the crimping dies in closed position and the actuating trigger 59 depressed so that the extension 19 and piston 17 are in their fully extended position, the lock nut 123 is loosened and adjusting link 35 is rotated in its socket 40 until the crimping dies 30 and 31 are firmly supported. Upon obtaining firm support of the crimping dies 30 and 31, the lock nut 123 is then tightened, securing parts 35 and 40 in proper position. This type of adjustment allows for wider manufacturing tolerances.

The free floating action of the cam and piston is obtained in this way: The rounded ball-shaped end is located at the bottom of cam or piston extension 19 and mates in the spherical seat or groove 23 in piston 17. This allows the piston extension 19 to rotate slightly if necessary in any direction through a small angle. Therefore, if manufacturing tolerances or other factors allow the piston extension to tilt slightly, the piston itself will not tilt within the cylinder due to the mating spherical ball and spherical groove. The piston, therefore, cannot jam in the cylinder and prevent the tool from functioning properly. This allows wider manufacturing tolerances to be used. Conventional packing ring 25 prevents leakage around the mating spherical ball and spherical groove.

The novel crimping mechanism permits both upper and lower die parts to be linearly opened and closed about a connector which may thus slide laterally into the proper position for crimping in its cartridge block support. The linear movement of the die parts also gives a better crimp. By providing a stop for the transported connector, we are able to continue crimping operations even though one or more connectors may have been removed from the carry block for various reasons. The same cartridge block may be employed for various sizes and types of connectors with corresponding adjustment sometimes required only in the crimping dies.

We have thus described our invention, but we desire it understood that it is not confined to the particular form or uses shown and described, the same being merely illustrative and that the invention may be carried out in other ways without departing from the spirit of our invention and therefore we claim broadly the right to employ all equivalent instrumentalities coming within the scope of the claims, and by means of which objects of our invention are attained and new results accomplished, as it is obvious that the particular embodiments herein shown and described are only some of the many that can be employed to attain these objects and accomplish these results.

We claim:

1. An assembly of elongated electrical connectors, comprising: an elongated unitary rectangular block having a plurality of spaced apart bores therein the central axis of said bores disposed in a plane; a connector having a first and second shoulder disposed in each of said bores; a first axially flexible resilient constriction in said bore to cooperate with one of said connector shoulders to prevent overinsertion of said connector into said bore; a second axially flexible resilient constriction spaced from said first constriction in said bore gripping said connector and preventing accidental withdrawal of said connector from said bore.

2. An assembly of elongated electrical connectors, comprising: an elongated unitary rectangular block, having a plurality of spaced apart bores therein the central axis of said bores disposed in a plane; a connector disposed in each of said bores; a first axially flexible constriction in each said bore to prevent overinsertion of each said connector; a radial projection on each said connector; a second axially flexible resilient constriction spaced from said first constriction in each said bore adapted to be distorted and passed by said connector radial projection when each said connector is forcibly inserted into each said bore and to snap-lock behind said radial projection, thereby preventing accidental withdrawal of each said connector from each said bore.

References Cited by the Examiner
UNITED STATES PATENTS

| | | | |
|---|---|---|---|
| 2,134,128 | 10/1938 | Hopkins | 206—52 |
| 2,515,669 | 7/1950 | Scholl | 206—52 |
| 2,521,056 | 9/1950 | Frei et al. | 339—63 |
| 2,823,789 | 2/1958 | Henning | 206—56 |
| 2,964,171 | 12/1960 | Chadwick | 206—56 |
| 2,971,637 | 2/1961 | Simons | 206—65 X |
| 2,996,329 | 8/1961 | Glazer | 206—65 |

FOREIGN PATENTS 705,943  3/1954  Great Britain.

THERON E. CONDON, *Primary Examiner.*

WALTER A. SCHEEL, GEORGE O. RALSTON,
*Examiners.*